Aug. 25, 1964
T. A. RUBLE ETAL
3,146,080
CARBON BLACK COLLECTING PROCESS
Filed Aug. 1, 1960
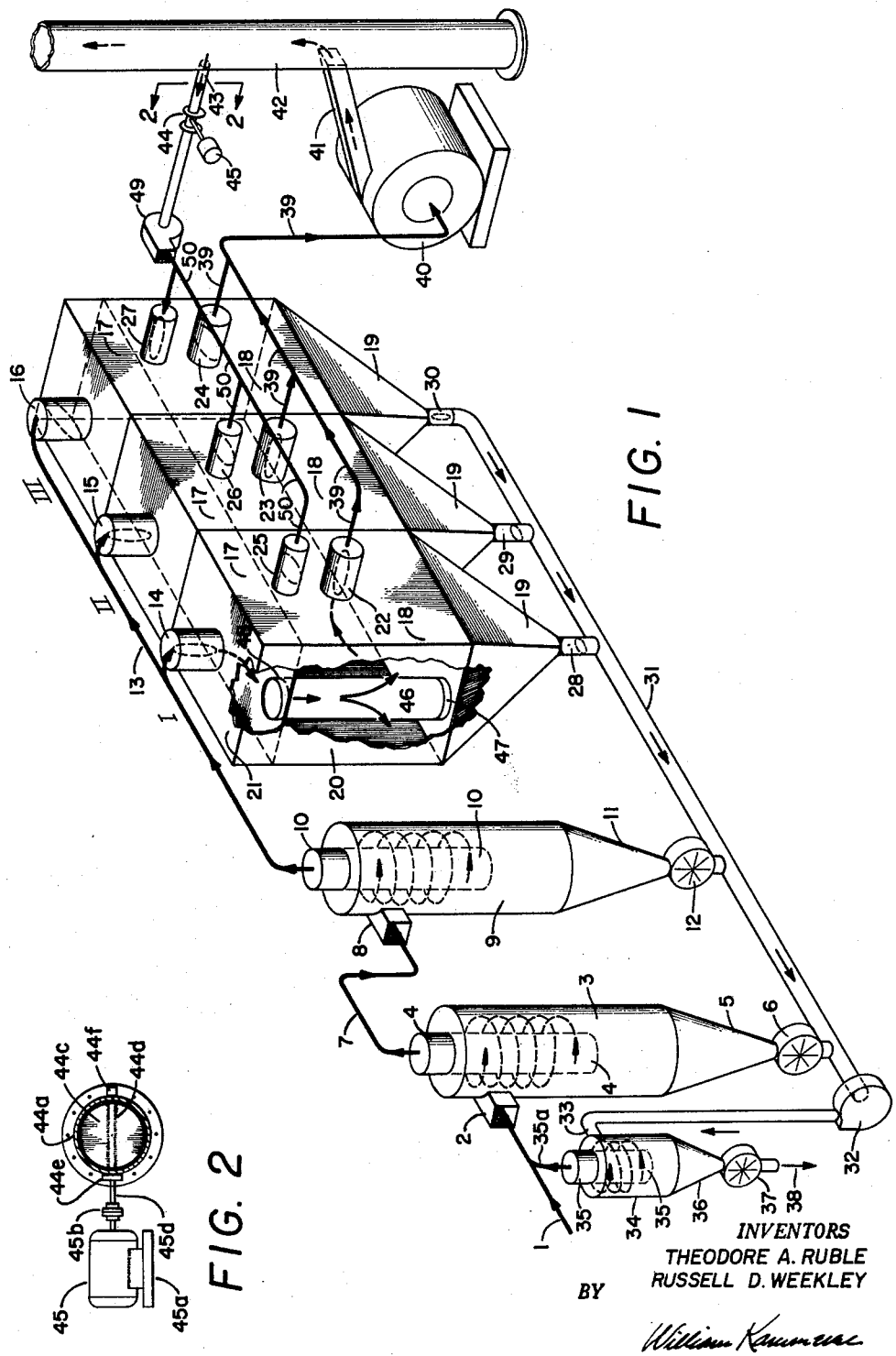
INVENTORS
THEODORE A. RUBLE
RUSSELL D. WEEKLEY
BY
*William Kammerer*
ATTORNEY

3,146,080
CARBON BLACK COLLECTING PROCESS
Theodore A. Ruble and Russell D. Weekley, Amarillo, Tex., assignors to Continental Carbon Company, Amarillo, Tex., a corporation of Delaware
Filed Aug. 1, 1960, Ser. No. 46,559
7 Claims. (Cl. 55—96)

This invention relates to the art of manufacturing carbon black and more particularly concerns an improved method for separating impalpable and/or colloidal-like carbon black particles from gaseous streams containing said particles suspended therein. Specifically, the present invention relates to an improved process for substantially completely recovering carbon black from the hot gaseous effluent product of a carbon black producing furnace which comprises subjecting said effluent to mechanical separatory means and then filtering the gas from said separators utilizing a bag filtering technique which permits cleaning of the bags to be beneficially and uniquely accomplished as an integral but cyclically controlled step in the overall filtering operation. A further aspect of this invention pertains to a novel manner of employing filtered carbon black effluent gas to continuously remove and convey the carbon black product from a recovery system.

In the art of producing carbon black by a pyrolytic process, the hot gaseous effluent (about 1200° F.) from the pyrolysis reactor containing the suspended carbon black product is cooled to temperature in the order of about 400° F. This is generally accomplished by a quenching operation consisting of contacting the effluent near the exit of the reactor with a spray of water. The cooled effluent is then conveyed to a recovery system and therein the carbon black is separated by gravitational separatory means such as cyclones to effect recovery of the bulk of the product. In order to recover the greatest amount of carbon black from the effluent and additionally in order to obviate creating a nuisance by discharging the carbon black containing gases from the cyclone separators into the atmosphere, it is customary to filter the gases through cloth or fabric bags. This method of filtering as practiced in the prior art primarily suffers in that it quickly induces impairment of the mechanical strength properties of the filter bag and/or severely limits the choice of fabric material.

An object of this invention is to provide an improved method for removing particulate substances from tenuous gaseous suspensions thereof.

It is a further object of this invention to provide an improved method for completely recovering carbon black particles from a pyrolytic reaction effluent which has been subjected to a primary separation step adapted to remove the bulk of the carbon black originally contained by said effluent.

Still another object of this invention is to provide a bag filtering method for substantially completely removing carbon black particles from gaseous suspensions thereof whereby the useful life of the filter bag is considerably extended beyond that normally observed in prior art filtering processes of this type.

Other objects and advantages of this invention will be readily perceived by those skilled in the art upon consideration of the detailed discussion presented hereinbelow of a preferred embodiment of our novel process.

In the commercial production of carbon black utilizing a process involving the pyrolysis of carbonaceous materials, the normally high dew point of the carbon black bearing effluent gases renders it desirable to maintain the effluent at the highest temperature possible so as to minimize condensation and corrosion within the recovery system. By and large the type of fabric bag filters used in the recovery assembly determines the maximum temperature than can be safely used. Consequently the trend in this industry within recent years has been to use glass cloths bags which are comparatively resistant to relatively high temperatures, that is, temperatures in the order of about 200° F. higher than the maximum temperature that can be suitably used when employing bags fabricated from natural or synthetic (plastic) fibers. Additionally, filter bags fabricated from glass fibers are less prone to chemical attack. The latter is an important consideration since there are significant amounts of acidic components existing in carbon blacks, especially those prepared from many petroleum feedstocks. However, one prominent disadvantage residing in the use of glass cloth bags is that such fabrics are considerably more subject to wear and deterioration by mechanical stressing than the other types of fabrics. As can be appreciated, bag filters must be periodically cleaned in order to maintain their filtering efficiency as well as to recover the black deposit adhering to the surface thereof. Hitherto, as will be seen herein, the methods of cleaning practiced in this art have a deleterious effect on the wear resistance of all bag filters, and particularly of glass cloth bags.

In the bag filtering assemblies commonly used in the carbon black industry individual filtering compartments are provided as housings for the bags. The open end of the bag is secured by a ring or other suitable means into a round opening in a cell plate forming a base of a compartment. This opening in turn is in communication with a tapered receiving hopper suspended below the cell plate. Generally, a plurality of bags are used in each compartment, and also a plurality of compartments arranged in parallel flow arrangement are used. The top closed ends of the bags are vertically supported within the compartment by a separate framework which framework is ordinarily shaken mechanically during a repressuring or cleaning cycle so as to loosen the trapped carbon black adhering to the surface of the bags. This shaking action causes a considerable degree of wear of the bag areas adjacent to said top and bottom support members. In the prior art bag filtering assemblies, the carbon black bearing gas is generally introduced through an opening in the side of the hopper from whence the gas passes upwardly through the inside of the bags and out through the cloth thus leaving the entrained carbon black trapped on the inner surface of the bag. In the cleaning, or what is termed conventionally as a repressuring cycle, filtered gas obtained from one or more compartment units undergoing filtering is introduced directly into the compartment undergoing cleaning. The reverse flow of repressuring gas through the cloth coupled with the bag shaking action effectively cleans the bags of the accumulated layer of carbon black.

Most of the carbon black drops into the bottom of the hopper and is suitably retrieved therefrom. However, a portion of the black adhering to the bag and to a very objectionable degree, the black residing in the hopper is re-entrained in the repressuring gas. The repressuring gas must accordingly be refiltered and it is generally the practice to permit such gas to exit through the hopper side from whence it is introduced into the manifold supplying effluent to those compartments operating on filtration. This procedure has a considerable adverse effect on the overall efficiency of the filtering system.

Our improved process as will be seen from the detailed discussion thereof that follows obviates the aforesaid principal disadvantages of the prior art. More particularly our process minimizes mechanical stress on the bag during the cleaning operation and thereby markedly prolongs the useful life thereof. Additionally, as will be seen, no unobjectionable resuspension of carbon black in the repressuring gas is realized in carrying out the present process and furthermore the repressuring gas is advantageously utilized to convey the carbon black product from the recovery system.

In the accompanying drawing:

FIG. 1 is an isometric elevation of a carbon black recovery system for a furnace black manufacturing plant, said recovery system embodying the principles of the present invention.

FIG. 2 is an enlarged sectional view of a repressuring gas pulsating damper taken along line 2—2 of FIG. 1.

In the drawing and more particularly in FIG. 1 thereof, there is shown three compartments of which compartments labeled I and II are on stream (filtering the carbon black bearing gases suspension emanating from a series of cyclone separators) and compartment III undergoing a repressuring cycle, that is, the bags are being cleaned by the reverse flow of cleaned effluent gas passing therethrough.

The carbon black bearing effluent gases 1 from the carbon black reactor (not shown) enter tangential inlet 2 of cyclone 3 and pass in a helical flow fashion in the concentric space between the center pipe 4 and the outer shell of the cyclone 3. The larger size carbon black particles are thrown towards the perimeter of the cyclone shell by centrifugal force and drop into the cone portion 5 by gravity and thence are fed into the conveyor 31 by means of rotary gas lock 6.

The effluent gases then pass up through center pipe 4 and leave the cyclone through connecting duct 7. The gas stream progresses into tangential inlet 8 of the second cyclone 9 and there, as in the preceding cyclone, similarly flow in an inwardly helical manner between inner pipe 10 and the outer shell of the cyclone. In the passage of the effluent through the various cyclones arranged in the series manner described, there is effected considerable agglomeration of the carbon black particles by the whirling and convoluted motions experienced therein. Consequently, the cyclones not only separate but additionally facilitate desirable agglomeration of the smaller size carbon black particles. In each cyclone the agglomerated particles capable of separating will settle into the cone and thus be in a position to be fed into the pneumatic conveyor passing below the discharge point of each cone.

In FIG. 1 only two cyclones in series have been shown in order to illustrate this separatory means. In actual practice in the carbon black industry, it is conventional to operate with at least four cyclones of the type described. Ordinarily such a number of cyclones in series will effect separation of from about 70 percent to 80 percent of the total carbon black present in most reactor effluents. As is known to those skilled in this art, a relatively large number of grades of carbon black can be produced by the pyrolysis reaction method and also any one of these various grades can be produced to the exclusion of the others. These grades primarily differ from one another with respect to the particle size of the black as produced in the reactor. Therefore in view of the above, the precise number of cyclones in the system is fairly a matter of choice but as indicated four of such devices will ordinarily suffice in a recovery system capable of handling all of the types of black that might be produced.

Regardless of the nominal particle size of the carbon black obtained from pyrolysis reactors, there always exist a certain amount of extremely small or impalpable particles which are exceedingly difficult and impractical to separate or agglomerate by means of mechanical separators such as the cyclones described. While it is economically advantageous to recover this relatively small amount of finely divided particles the primary concern for recovering same is to obviate creating a nuisance such as would occur if this lean effluent were discharged into the atmosphere. Consequently the carbon black industry utilizes a filtering technique in order to collect these small particles which technique on the whole is superior to the use of electric pricipitators. Our process also employs a filtering operation in cleaning up the effluent.

In the presently described embodiment, a bag filter unit consists of an elongate cylindrical fabrication 46 vertically mounted within a filtering compartment. Referring to the drawing and particularly to the cut away view of compartment I, the bag 46 is suitably mounted at the bottom over a nipple 47 which is rigidly attached to the bottom cell plate 18 of the compartment. The top of the bag is similarly mounted over nipple 48 attached to the top cell plate 17 of the compartment. The number of individual bags used in each compartment and consequently the size of the compartment needed to accommodate the number of bags utilized is determined by the effluent handling capacity required. Ordinarily about one square foot of bag area for each c.f.m. of effluent flow is needed for a bag fabricated of a cloth having about 50 percent permeability. In the bag filtering zone arrangement specifically illustrated in the accompanying drawing, this cloth area would be based on two compartments as it is contemplated that one compartment will be undergoing cleaning in accordance with this invention as will be described more in detail hereinbelow.

The effluent leaving the cyclone system enters compartments I and II of the bag filtering zone through inlet manifold 13 and open dampers 14 and 15 into the space between the roof plate 21 and the upper cell plate 17. The effluent proceeds down through the upper bag nipple 48 and then passes through the cloth of the bag 46 which filters out suspended carbon black. It is to be understood, as previously indicated, that it may be desirable to use a plurality of bags in each compartment. In describing the present embodiment, reference is made to only one bag for simplicity sake.

The clean effluent gas leaves compartments I and II through open outlet dampers 22 and 23 and passes through outlet manifold 39, being withdrawn in this manner by fan 40. The clean effluent gas is discharged from said fan 40 through tangential fan outlet 41 into a stack 42. It is to be noted that in the filtering portion of the cycle instantly described, the repressuring dampers 25 and 26 and the hopper dampers 28 and 29 of compartments I and II are all closed so that no repressuring gas can enter into these compartments and no gas can enter the conveyor 31 through the hoppers 19 thereof. During the portion of the cycle presently described there is introduced repressuring gas through compartment III, thus effecting cleaning of the bags existing therein. In accomplishing this, clean repressuring gas is drawn from stack 42 through duct 43 and pulsating damper 44 by the repressuring fan 49 and thence forced into the repressuring manifold 50.

A detailed drawing of the pulsating damper 44 is shown in FIG. 2. More particularly, this damper consists of a thin disc 44c supported on shaft 45d capable of turning a full 360° in pipe housing 44a. A clearance of about ¼" between the edge of the disc and housing can be satisfactorily used. The shaft 44d turns in the bearing 44f and packing gland 44e through coupling 45b by gear motor 45 which is mounted on the support 45a. The damper 44c is turned slowly providing two "on" and two "off" repressuring gas pulses for each revolution of the damper. The damper can be revolved at various rates; however generally a revolution rate in the order of about 10 r.p.m. provides an ample pulsating effect.

The pulsating gas flow proceeds from repressuring manifold 50 through the open repressuring damper 27 into compartment III and is thus directed to the outside of the bags just below the cell plate 17. The clean repressuring gas flow then carries through the cloth of the bags from the outside to the interior thereof and then down through the bags and leaves through the lower nipples 47 into the hopper 19 below the lower cell plate 18.

The pulsating flow of the repressuring gas causes the bags to gently flex in and out thus breaking the layer of accumulated carbon black on the inside of the bags.

The gas flow facilitates the carrying of the loosened carbon black into hopper 19. The repressuring gas carries the loosened carbon black down through the open damper 30 into the pneumatic conveyor 31. Accordingly the repressuring gas becomes the conveyor gas flowing in the pneumatic conduit under cyclones 11 and 5 picking up the carbon black that flows thereinto through rotary gas locks 6 and 12. Pneumatic conveyor fan 32 blows the fluidized carbon black through tangential inlet 33 into conveyor cyclone 36. The fluidized carbon black flows in a helical manner between outer shell 34 and inner pipe 35 of the conveyor cyclone and therein is effected separation of most of the carbon black which by this time is well agglomerated. The carbon black 38 drops into hopper 36 passing through the rotary gas lock 37 and thence onto further processing equipment such as pelletizers, etc. The pneumatic conveyor gas leaves center pipe 35 and is recycled through line 35a into tangential inlet 2 of the primary cyclone 3.

In the second phase of the filtering cycle, the dampers 15, 23, 27 and 30 all assume a closed position while dampers 26, 29, 16 and 24 simultaneously open. This change of damper positions shifts compartment II to cleaning or repressuring and compartment III to filtering while compartment I continues to remain on filtering.

In the third and final phase of the filtering cycle of the system shown, compartment I is changed from filtering to repressuring or cleaning while compartment II is shifted from repressuring to filtering and compartment III continues on filtering by suitable operation of the dampers involved. The filtering cyclone then commences again after the bags in compartment I are cleaned.

The dampers capable of providing the various flow arrangements described above can be conveniently actuated by means of pneumatic air cylinders whose operation can be controlled so as to correspond to any cyclical pattern desired by means of conventional electric timers.

Various lengths of time can be selected for accomplishing a cycle of filtration and such choices will be dependent on the number of compartments used, the ratio of compartments filtering to those undergoing repressuring at any given time and so forth. With regard to the specific illustration presented herein, it has been noted that a three-minute overall cycle results in good cleaning with a minimum of pressure drop across the various bag filters. Utilizing a three-minute cycle it can be seen that each compartment is subjected to a filtering action for two minutes and undergoes a cleaning operation for one minute.

It is of course appreciated that those skilled in the art can readily make many modifications and variations of the present invention as above set forth without departing from the spirit thereof; and therefore the only limitations contemplated are those expressed in the appended claims.

We claim:
1. In a process for recovering carbon black product from an effluent of a carbon black furnace, wherein said effluent is passed in series flow through a plurality of gravitational separators thence through a bag filtering zone; the improvement which includes the steps: (1) introducing the gaseous efflux from said separators into said filtering zone having at least two filtering compartments and wherein each of said compartments contains a gas permeable medium comprising at least one filter bag; (2) continuously and cyclically effecting filtering of said efflux in less than all of said compartments with contemporaneous cleaning of the filter medium of that portion of said zone existing in the nonfiltering phase by contacting the surface of the last named medium opposite the filtering surface thereof with a pulsating flow of repressuring gas substantially free of carbon black particles; and (3) continuously discharging said repressuring gas, carbon black dislodged from the surface of said filter medium and the separated carbon black of said gravitational separators into a pneumatic product conveyor whereby said repressuring gas serves to effect transport of the so recovered carbon black residing in said conveyor.

2. A process for recovering carbon black from an effluent of a carbon black furnace which comprises: cooling said effluent to between about 400° F. and 600° F.; passing the cooled effluent in series flow through a plurality of cycyone separators; introducing the gaseous efflux from said separators into a filtering zone having at least two filtering compartments and wherein each of said compartments contains a gas permeable medium comprising at least one glass cloth filter bag; continuously and cyclically effecting filtering of said efflux in less than all of said compartments with contemporaneous cleaning of the filter medium of that portion of said zone existing in the non-filtering phase by contacting the surface of the last named medium opposite the filtering surface thereof with a pulsating flow of repressuring gas substantially free of carbon particles; and continuously discharging said repressuring gas, carbon black dislodged from the surface of said filtering medium and the separated carbon black of said cyclone separators into a pneumatic product conveyor whereby said repressuring gas serves to effect transport of the so recovered carbon black residing in said conveyor.

3. A process for recovering carbon black from an effluent of a carbon black furnace which comprises: cooling said effluent to between about 400° F. and 600° F.; passing the cooled effluent in series flow through a plurality of cyclone separators; introducing the gaseous efflux from said separators into a filtering zone having three filtering compartments and wherein each of said compartments contains a gas permeable medium comprising at least one glass cloth filter bag; continuously and cyclically effecting filtering of said efflux in two of said compartments with contemporaneous cleaning of the filter medium in the remaining compartment by contacting the surface of the last named medium opposite the filtering surface thereof with a pulsating flow of repressuring gas substantially free of carbon black particles; and continuously discharging said repressuring gas, carbon black dislodged from the surface of said filtering medium and the separated carbon black of said cyclone separators into a pneumatic product conveyor whereby said repressuring gas serves to effect transport of the so recovered carbon black residing in said conveyor.

4. A process in accordance with claim 2 wherein the repressuring gas comprises the filtered efflux of said cyclone separators.

5. A process in accordance with claim 3 wherein the repressuring gas comprises the filtered efflux of said cyclone separators.

6. A process in accordance with claim 2 wherein the repressuring gas is pulsated at a frequency of about 20 pulses per minute.

7. A process in accordance with claim 3 wherein the repressuring gas is pulsated at a frequency of about 20 pulses per minute.

References Cited in the file of this patent
UNITED STATES PATENTS

| | | |
|---|---|---|
| Re. 24,521 | Young | Aug. 19, 1958 |
| 1,163,318 | Bryant | Dec. 7, 1915 |
| 2,717,658 | Bethea et al. | Sept. 13, 1955 |
| 2,835,562 | Boyer et al. | May 20, 1958 |
| 2,871,978 | Webster et al. | Feb. 3, 1959 |